United States Patent
Dostert et al.

(10) Patent No.: US 7,148,788 B2
(45) Date of Patent: Dec. 12, 2006

(54) METHOD FOR TRANSMITTING HIGH-FREQUENCY SIGNALS TO LOW-FREQUENCY NETWORKS AND CORRESPONDING SYSTEM

(75) Inventors: Klaus Dostert, Krickenbach (DE); Gerd Griepentrog, Gutenstetten (DE); Reinhard Maier, Herzogenaurach (DE); Richard Schmidt, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 526 days.

(21) Appl. No.: 10/362,185

(22) PCT Filed: Aug. 13, 2001

(86) PCT No.: PCT/DE01/03104

§ 371 (c)(1),
(2), (4) Date: Feb. 21, 2003

(87) PCT Pub. No.: WO02/17509

PCT Pub. Date: Feb. 28, 2002

(65) Prior Publication Data

US 2003/0232599 A1 Dec. 18, 2003

(30) Foreign Application Priority Data

Aug. 24, 2000 (DE) ................................ 100 41 702

(51) Int. Cl.
*G05B 11/01* (2006.01)
*H04B 3/54* (2006.01)

(52) U.S. Cl. ............................ 340/310.11; 340/310.12; 340/310.13; 340/310.17; 340/310.18; 455/66.1; 455/402; 370/485

(58) Field of Classification Search ..............................
340/310.01–310.05, 310.11, 310.12, 310.13,
340/310.17, 310.18
See application file for complete search history.

(56) References Cited

U.S. PATENT DOCUMENTS

| | | | |
|---|---|---|---|
| 3,699,272 A | 10/1972 | Fritz | |
| 5,684,450 A * | 11/1997 | Brown | ..................... 370/493 |
| 5,717,685 A * | 2/1998 | Abraham | ..................... 370/276 |
| 5,856,776 A * | 1/1999 | Armstrong et al. | .... 340/538.15 |
| 6,452,482 B1 * | 9/2002 | Cern | ..................... 375/258 |

FOREIGN PATENT DOCUMENTS

| | | |
|---|---|---|
| DE | 44 18 296 A1 | 11/1995 |
| DE | 195 04 587 A1 | 8/1996 |
| EP | 0 684 681 A1 | 11/1995 |
| EP | 0 889 602 A2 | 1/1999 |
| GB | 2 330 455 A | 4/1999 |
| JP | 01221028 | 9/1989 |
| WO | WO 01/54297 A1 | 7/2001 |

* cited by examiner

*Primary Examiner*—Donnie L. Crosland
(74) *Attorney, Agent, or Firm*—Morrison & Foerster LLP

(57) ABSTRACT

It is a known fact that even information signals in the kilohertz and megahertz range can be transmitted via the bus systems of power transmission networks. The invention provides a method and a system for improving the transmission behavior by feeding the signals not to the bus of the power supply but at the end of an outgoing line or a bus bar trunking system facing away from the power feed. The connection to the telecommunication system is made via a PLC bus line (10), said bus line (10) being connected to the bus bar trunking systems/outgoing lines (2, 2', . . . ) via PLC bus elements (12, 12', . . . ).

12 Claims, 2 Drawing Sheets

METHOD FOR TRANSMITTING HIGH-FREQUENCY SIGNALS TO LOW-FREQUENCY NETWORKS AND CORRESPONDING SYSTEM

CLAIM FOR PRIORITY

This application claims priority to International Application No. PCT/DE01/03104 which was published in the German language on Feb. 28, 2002.

TECHNICAL FIELD OF THE INVENTION

The invention relates to a method for transmitting radio-frequency signal information on low-voltage networks and to an arrangement for carrying out the method.

BACKGROUND OF THE INVENTION

Data transmission of radio-frequency signals on mains cables is known. This allows information to be transmitted in addition to or as an alternative to conventional telephony, which is particularly advantageous since electrical networks with mains connections exist virtually everywhere. Particularly for industrial low-voltage networks with busbar systems and distribution busbars, this results in the capability to set up a dedicated data transmission system.

Typically, power is transmitted in industrial systems via busbar systems, which are in turn fed from a transformer that is located in the immediate vicinity. Loads are connected to the busbar system via outgoer cables in the form of individual cables or distribution busbars. Distribution busbars are in turn longitudinally extended and encapsulated solid conductors with a relatively small cross section, which in manufacturing systems are generally fitted horizontally underneath or above the loads that are to be supplied. Furthermore, distribution busbars have outgoers that are arranged in a specific pattern, and to which the loads can be connected by means of so-called tap-off boxes.

Busbar systems and distribution busbars in low-voltage networks are, for telecommunications purposes, conductors with a very high characteristic impedance in the range of several hundred ohms. In addition, power-feeding busbar systems with their high prospective short-circuit currents and very low impedances represent, in particular, low-impedance shorts for signals in the frequency band from 100 kHz to several MHz, in which, for example, modern powerline communication (PLC) systems operate. Consequently, the levels of signals which are fed into the busbar system directly are highly attenuated. In conjunction with the high interference levels which occur in industrial low-voltage networks, protected data traffic is no longer possible with this type of feed even after comparatively short distances of a few tens of meters.

EP 0 889 602 A2 discloses a data transmission system for transmitting data via at least one electrical power cable, with the data being input and output at the end areas of a power transmission cable. Furthermore, DE 44 18 296 A1 discloses network coupling being provided for data transmission via an electrical distribution network with associated filters to the coupling points. Finally, DE 9 504 587 A1 discloses a two-way communication system for power supply networks in a low-voltage network, in which data is transmitted.

Furthermore, JP 01-221028 A discloses a power cable transmission system (PLC) which has load lines with blocking filters which allow current to pass at the mains frequency (50 or 60 Hz) in order to supply power, but which block radio-frequency signals. Furthermore, a logic circuit which carries out a digital data interchange via so-called special lines is arranged between the PLC units which supply the individual load lines.

SUMMARY OF THE INVENTION

The invention reduces the attenuation of the signals during transmission.

According to one embodiment of the invention, there is a method for transmitting radio-frequency signals on low-voltage networks, and a system for same.

In one embodiment of the invention, the signals are not fed in solely via that end of the outgoer cables which is opposite the busbar system but, in fact, signal conditioning is carried out at the same time at the feed points by means of a PLC coupling cable, which ensures that the radio-frequency communications signals have a perfect quality at the feed points. This results in data being interchanged with a good transmission response between modems on various outgoer cables or distribution busbars. A filter which has a high impedance for the radio-frequency communications signals but has a low impedance for the mains frequency avoids any short, thus making a considerable contribution to improving the transmission response.

With one arrangement according to the invention, the telecommunications coupling of the outgoer cables/busbar systems is made via a PLC coupling cable which, if necessary, includes repeaters, that is to say bidirectional amplifiers, and which are connected to the outgoer cables/distribution busbars via PLC coupling units. The PLC coupling units may be capacitive and/or in the form of transformers, or else may include active elements such as amplifiers.

The filter may advantageously comprise a sleeve, which is fitted around the individual conductors of the supply cable and is composed of magnetic material, with the sleeve advantageously being split in order to make it easy to apply without having to disconnect the cable.

BRIEF DESCRIPTION OF THE DRAWINGS

Further details and advantages of the invention will become evident from the following description of the figures of exemplary embodiments with reference to the drawing, in which figures.

DETAILED DESCRIPTION OF THE INVENTION

Figure 1:
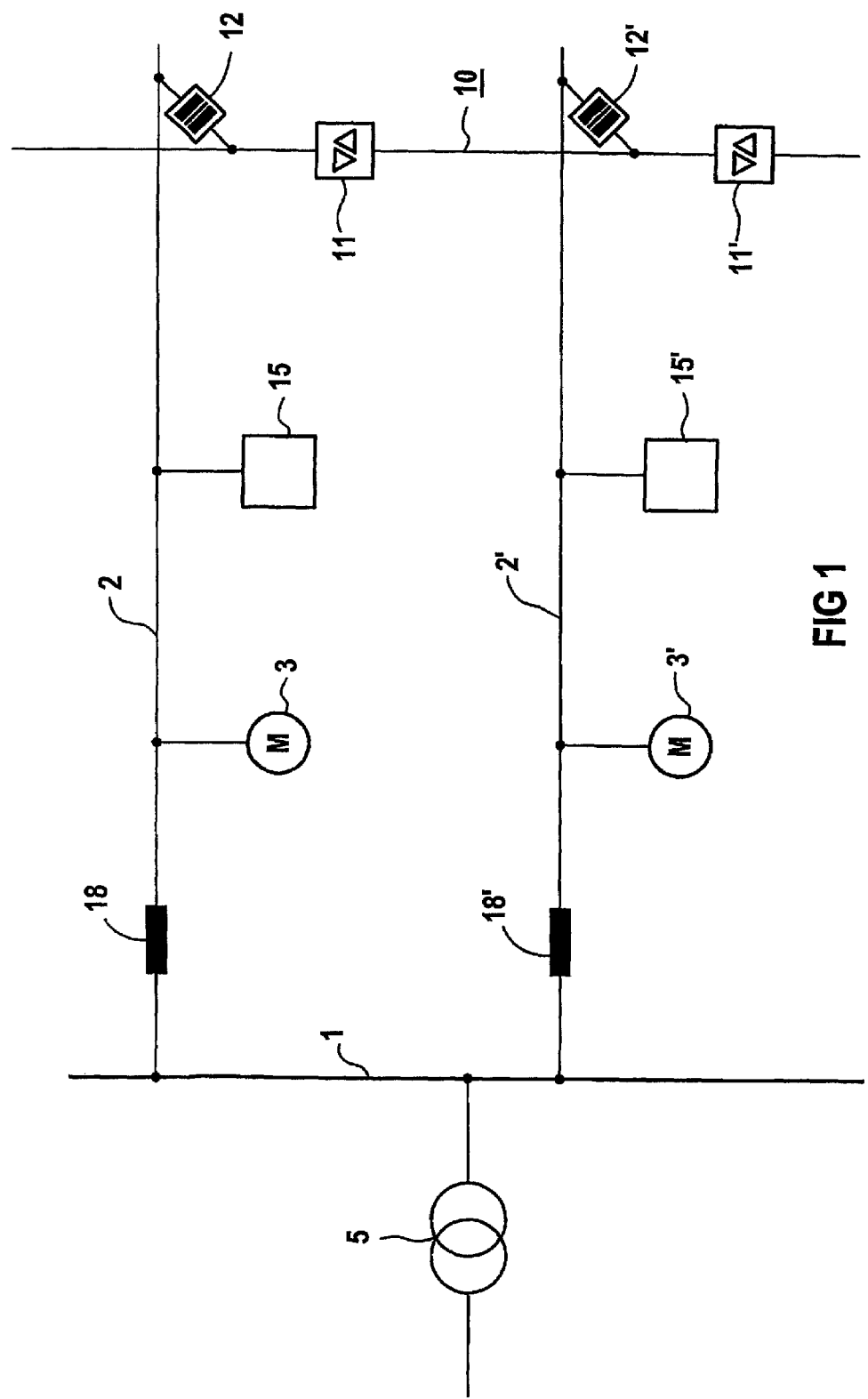
FIG. 1 shows an arrangement for transmitting radio-frequency signals on industrial low-voltage networks.

In FIG. 1, reference numeral 1 denotes a busbar of an industrial low-voltage network. Electrical power is transmitted to the load via busbars such as these. The electrical power is fed via a transformer 5.

Outgoer cables or distribution busbars originate from the busbar system. By way of example, the distribution busbars 2 and 2' are shown. Further outgoer cables or distribution busbars may be provided.

Individual loads 3, 3', . . . , for example motors, are connected to the outgoer cables/distribution busbars 2, 2', . . .

In FIG. 1, a PLC coupling cable is provided at that end of the outgoer cables or distribution busbar which faces away from the busbar system. Bidirectional amplifiers 11, 11', . . . are connected at appropriate intervals in this coupling cable and, in practice, are also referred to as so-called repeaters. The coupling cable 10 is connected to the outgoer cables 2, 2', . . . or to the distribution busbars relating to them via PLC coupling units 12, 12', . . . The radio-frequency signals are fed into the outgoer cables or distribution busbar via the coupling units 12, 12', . . .

The PLC coupling units are designed in a known manner to be capacitive or are in the form of transformers. They may also contain further elements from the prior art, in particular such as amplifiers.

In the arrangement shown in FIG. 1, the outgoer runs 2, 2', . . . and the correspondingly designed distribution busbars each have associated PLC control units 15, 15', . . . These control units ensure that the information signals are fed in at the correct time.

The described arrangement thus results in the signals being fed into that end of the outgoer cable or distribution busbar which faces away from the busbar system. In order to prevent shorting of the busbar system and of the signal feed, a filter 20, 20', . . . is connected in each of the outgoer cables/distribution busbars. These filters 18, 18', . . . have a high impedance for signals in the frequency band of the power line, but have a low impedance for the mains frequency, thus avoiding any shorting.

Figure 2:
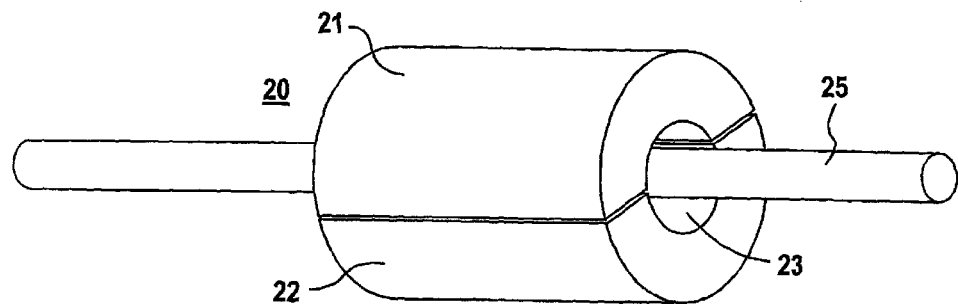
FIG. 2 shows a first embodiment of a filter used for the arrangement as shown in FIG. 1.

By way of example, FIG. 2 shows the construction of one such filter. The filter comprises a cylindrical sleeve 20 composed of magnetic material. The sleeve 20 is formed from two half cylinders 21 and 22 in order to make it easier to fit, which cylinders, when joined together, form the cylindrical sleeve with a central channel 23, in which an electrical conductor 25 is carried in an electrically insulated manner.

Figure 3:
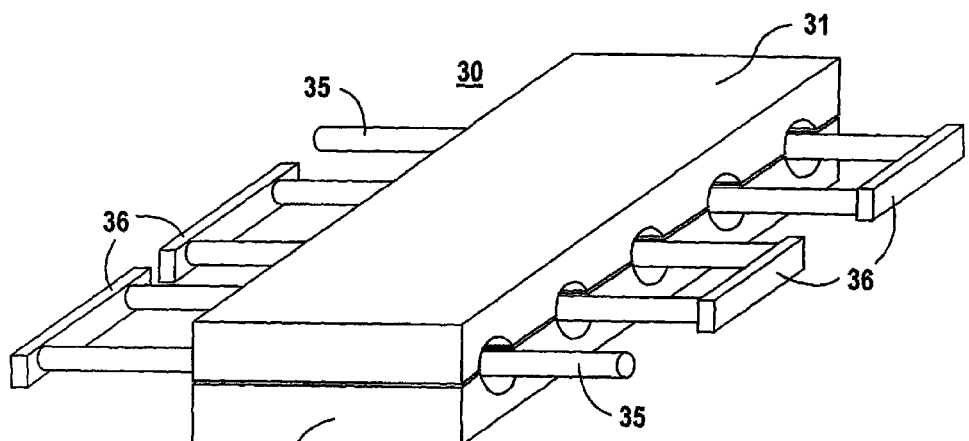
FIGS. 3 and 4 show two alternative embodiments to that in FIG. 2.
Figure 4:
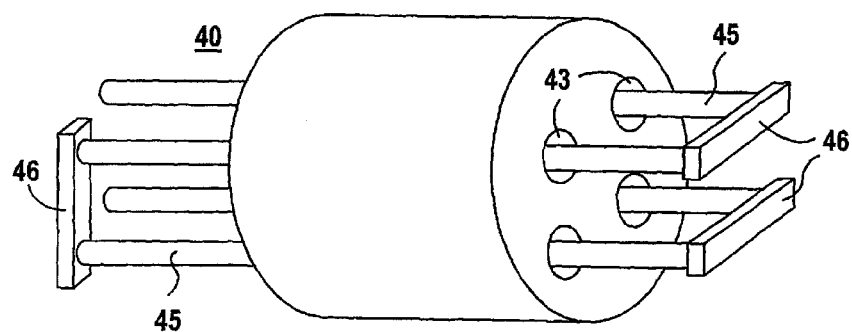

Further embodiments are available as alternatives to FIG. 2, for the filter 18 shown in FIG. 1. These alternatives are illustrated in FIGS. 3 and 4: in FIG. 3, two plates 31 and 32 composed of magnetic material and each having a number of parallel, mutually opposite recesses surround a number of parallel channels 33, when joined together. The filter 30 thus forms a flat unit in which a solid conductor 35 can be inserted and passed out more than once. At the end, suitable cross-connecting webs 36 are provided for the conductor 35.

In a corresponding way, a cylinder 40 composed of magnetic material in FIG. 4 has a number of parallel longitudinal channels 43 for holding a conductor 45, which is inserted and passed out of it, with cross-connecting webs 46 at the end. The cross-connecting webs 46 are oriented at right angles to one another on the opposite sides of the cylinder 40, so that the material volume of the cylinder 40 is used in an optimum manner for the filter.

The embodiments shown in FIGS. 3 and 4 in particular have advantageous characteristics in that the filters formed in this way have low capacitance and have high inductance in a small space. There is no need for any winding, and the filters which are formed from the components 30 and 40 may also be in the form of solid conductor bars for high currents.

The calculation example in the following text makes it evident, particularly for the filter shown in FIG. 1, that the required characteristics are achieved by the specified filters. The following data is quoted by way of example for the geometry and material of the filter: Length 10 cm, external diameter 8 cm, internal diameter 4 cm, $\mu_r = 5 \cdot 10^4$, Perlenorm 5050 H4 0.1 mm.

The reactance is dependent on the relative permeability, which in turn is influenced by the magnetic field strength and hence, in the end, by the current i.

This data results in the following figures:
i=0 A: reactance X at 500 kHz: 3 k$\Omega$, X at 50 Hz: 0.3 $\Omega$;
i=1 A: reactance X at 500 kHz: 3 k$\Omega$, X at 50 Hz: 0.3 $\Omega$;
i=10 A: reactance X at 500 kHz: 900 $\Omega$, X at 50 Hz: 90 m$\Omega$;
i=100 A: reactance X at 500 kHz: 100 $\Omega$, X at 50 Hz: 10 m$\Omega$;
i=1000 A: reactance X at 500 kHz: 10 $\Omega$, X to 50 Hz: 1 m$\Omega$.

The above result indicates that the reactance fluctuates as a function of the premagnetization by the 50 Hz current. The above values show that, for a 50 Hz current with a peak value of 1 kA, reactance X is 3 k$\Omega$ at the zero crossing and 500 kHz, and is 10 $\Omega$ at the peak value of the 50 Hz current. This relationship is taken into account during the design process.

The described arrangement ensures that a radio-frequency short in the busbar system that is used for feeding power is prevented for the power line signals by means of filters. This allows data traffic over longer distances in conjunction with the radio-frequency connection on the outgoer cables and distribution busbars by means of the PLC coupling cable including any signal conditioning in the bidirectional amplifiers/repeaters.

What is claimed is:

1. A method for transmitting radio-frequency signals on low-voltage networks, in which electrical power is provided from a central power supply by busbars and is passed via at least one of outgoer cables and distribution busbars to loads, having input points for feeding in signals in kilohertz and megahertz bands and outgoer points for tapping off signals and power which are transmitted on a conductor system, comprising:
    feeding the signals in at an end of the outgoer cables and distribution busbars which is opposite mains-frequency power feed to improve a transmission response; and
    connecting the outgoer cables and distribution busbars which carry radio-frequency signals for signal conditioning, at an end which is opposite the power feed by a PLC coupling cable, which carries radio-frequency signals, allowing data to be interchanged between modems on various outgoer cables and distribution busbars.

2. The method as claimed in claim 1, wherein a short between two respective outgoer cables or distribution busbars via the power feed is prevented by a filter which has a high impedance for signals in the frequency band used for communication.

3. A system for transmitting radio-frequency signals in low-voltage networks, in which electrical power is provided from a central power supply by busbars and is passed via at least one of outgoer cables and distribution busbars to loads, having input points for feeding in signals in kilohertz and megahertz bands and outgoer points for tapping off signals and power which are transmitted on a conductor system, comprising:
    a telecommunications coupling for conductor systems, wherein the telecommunications coupling is made via a PLC coupling cable, which carries radio-frequency signals, and in which the coupling cable is connected via PLC coupling units to the outgoer cables and distribution busbars.

4. The system as claimed in claim 3, wherein the PLC coupling units are at least one of capacitive and in the form of transformers.

5. The system as claimed in claim 3, wherein the coupling units include active elements.

6. The system as claimed in claim 5, wherein the active elements are amplifiers.

7. The system as claimed in claim 3, wherein the coupling cable includes bidirectional amplifiers.

8. The system as claimed in claim 3, further comprising a filter which has a high impedance for the frequency band on a data line but has a low impedance for a mains frequency, wherein the filter is composed of magnetic material.

9. The system as claimed in claim 8, wherein the filter is formed from a sleeve, which is fitted around an individual conductor of a supply cable.

10. The system as claimed in claim 9, wherein the sleeve is in the form of a split sleeve to be applied to the cable.

11. The system as claimed in claim 8, wherein the filter is formed from two flat parts having parallel recesses which, together, form a box with channels in which a conductor can be inserted and passed out more than once.

12. The system as claimed in claim 8, wherein the filter is formed from a cylinder with a number of parallel channels, in which a conductor can be inserted and passed out more than once.

\* \* \* \* \*